(12) United States Patent
Kapp et al.

(10) Patent No.: US 10,336,600 B2
(45) Date of Patent: Jul. 2, 2019

(54) LOCKING AND EMPTYING SYSTEM OF REFILL CARTRIDGE CONTAINING NUTRIENTS OR CHEMICALS

(71) Applicant: Natufia Labs OÜ, Tallinn (EE)

(72) Inventors: Lauri Kapp, Tallinn (EE); Gregory Francis Chakwan Lu, Püünsi küla (EE)

(73) Assignee: NATUFIA LABS OÜ, Tallinn (EE)

( * ) Notice: Subject to any disclaimer, the term of this patent is extended or adjusted under 35 U.S.C. 154(b) by 233 days.

(21) Appl. No.: 15/473,809

(22) Filed: Mar. 30, 2017

(65) Prior Publication Data

US 2017/0334593 A1    Nov. 23, 2017

(30) Foreign Application Priority Data

May 18, 2016 (EE) .................. 201600019 U

(51) Int. Cl.
*B67D 7/02* (2010.01)
*A01C 23/00* (2006.01)
*A01G 31/00* (2018.01)

(52) U.S. Cl.
CPC ............ *B67D 7/0288* (2013.01); *A01C 23/00* (2013.01); *A01G 31/00* (2013.01)

(58) Field of Classification Search
CPC ...... B67D 7/0288; A01C 23/00; A01G 31/00; A47J 27/0807; A61B 17/2833; E05B 81/16; F42B 39/002; B41J 2/17506
USPC .............. 141/346–347, 377, 383; 347/86–87
See application file for complete search history.

(56) References Cited

U.S. PATENT DOCUMENTS

| | | | |
|---|---|---|---|
| 4,990,938 A * | 2/1991 | Brandon | B41J 2/1752 347/37 |
| 5,448,274 A * | 9/1995 | Hirabayashi | B41J 2/17513 347/50 |
| 6,003,985 A | 12/1999 | Bekki | |
| 9,738,086 B2 * | 8/2017 | Yoshida | B41J 2/175 |
| 2003/0184623 A1 | 10/2003 | Sasaki et al. | |
| 2012/0050423 A1 | 3/2012 | Ishikawa | |
| 2012/0249691 A1 | 10/2012 | Takagi et al. | |
| 2017/0334593 A1* | 11/2017 | Kapp | B67D 7/0288 |

FOREIGN PATENT DOCUMENTS

| | | | | |
|---|---|---|---|---|
| EE | U201600019 | * | 5/2016 | ......... B54B 69/0041 |
| EP | 1 623 834 A1 | | 2/2006 | |
| EP | 1 792 735 A1 | | 6/2007 | |
| EP | 2 397 335 A1 | | 12/2011 | |

* cited by examiner

Primary Examiner — Timothy L Maust
(74) *Attorney, Agent, or Firm* — Ladas & Parry LLP

(57) ABSTRACT

Present invention relates to a locking and emptying system of a refill cartridge containing nutrients or chemicals, said system comprising at least one replaceable refill cartridge, at least one receiving socket for the refill cartridge, in every receiving socket a locking mechanism of the refill cartridge, discharge means of the refill cartridge and control means of the locking system and for each refill cartridge a emptying container. The control means of the locking system are set to release the empty refill cartridge from the receiving socket only when the emptying container has enough free volume to receive the content of the next refill cartridge.

5 Claims, 8 Drawing Sheets

LOCKING AND EMPTYING SYSTEM OF REFILL CARTRIDGE CONTAINING NUTRIENTS OR CHEMICALS

TECHNICAL HELD

Present invention relates to locking and emptying system of a refill cartridges. Mainly the present invention relates to a locking and emptying system of a refill cartridges of nutrients or other chemicals used in an automatic growing cabinets of plants. Those refill cartridges contain for example nutrients for necessary for growing plants, compound for setting pH-level of water, etc. Also this type of a locking system of a refill cartridges can be used for pools and/or Jacuzzis, where those refill cartridges are used for chemical(s) for regulating pH-level of water and/or for chlorine compound for water purification. Also the locking system according to the inventions can be used in connection with aquariums.

BACKGROUND ART

The automatic growing cabinets of plants comprises reservoirs for nutrients and other chemicals. Refilling of those reservoirs usually includes opening cap of those containers and adding corresponding nutrient or other chemical from a bottle or some other container.

This poses a risk to the user—during pouring liquid may be spilled, this may become in contact with clothes or skin, cause etching or cause skin irritation. In addition just breading in a vapours of those products can be irritating and/or dangerous.

Because this kind of growing cabinets (or other places of use of those refill cartridges) are both in professional and non-professional use (for example at home, in office), it must be insured that third parties (for example children) do not become contact with said nutrients or other chemicals.

From prior art are known different types of refill cartridges, which are used in many different fields. The ordinary consumer is most familiar for example with refill cartridges used in the inkjet printers. But similar cartridges are being used also in other fields.

In traditional systems said refill cartridges are usually removable from their receiving sockets at any moment when need for that occurs. Usually such refill cartridges are fixed into the receiving socket with manually releasable snap-in joint or other resilient retainer, which enables to keep refill cartridge in place and also to remove it.

Usually locking and emptying system of the refill cartridge comprises at leas one replaceable refill cartridge, at least one receiving socket for the refill cartridge and in every receiving socket a locking mechanism for the cartridge.

For example such a refill cartridge is known from the US patent US2012249691A1 (published on Apr. 10, 2014).

DISCLOSURE OF INVENTION

Due to the field of use of refill cartridges of present invention and chemicals contained in those cartridges, which are often corrosive, one of the object of the present invention is to ensure, that refill cartridges can be retrieved from their receiving sockets only then, when said cartridges are completely empty and dry, i.e. there is no risk that user would become into contact with chemicals which were contained in those refill cartridges.

Also because those refill cartridges are used to replenish emptying containers (i.e. reservoirs for nutrients and other chemicals), the other object is to ensure that empty refill cartridge could be removed and replaced with new one only then when emptying container has enough space for receiving content of the another (new) refill cartridge.

Therefore present invention relates to a locking and emptying system of the refill cartridge comprising at least one replaceable refill cartridge, at least one receiving socket for the refill cartridge, in every receiving socket a locking system of the refill cartridge, discharge means of the refill cartridge and control means of the locking mechanism and for each refill cartridge a emptying container.

In the vicinity of the insertion end of the refill cartridge the upper face of the refill cartridge comprises a locking depression.

The end of the refill cartridge to be inserted into the receiving socket comprises at its bottom face a discharge opening, which is normally closed (i.e. when refill cartridge is unused and has not been fully inserted into the receiving socket). The discharge opening is closed by a membrane or other suitable closure.

The locking mechanism housed in the receiving socket comprises a lever mechanism actuatable by the end face of the cartridge, said lever mechanism comprises four mutually rigidly connected parts having mainly parallel longitudinal axes, where said longitudinal axes are crosswise to the insertion direction of the cartridge.

When refill cartridge is inserted into the receiving socket the end face of a cartridge is pressed against the first part of the lever mechanism, as a result of the lever mechanism is caused to rotate around the second part of the lever mechanism and as result also third and fourth parts of the lever mechanism are rotated around the second part of the lever mechanism, where said lever mechanism is biased to rotate around the second part to press its first part against the end face of the refill cartridge.

Biasing is implemented for example by resilient element such as spring. But instead of spring or additionally to the spring, said part may by biased also with electromagnetic pusher.

When refill cartridge is pushed completely to the receiving socket, the fourth part of the lever mechanism is engaged with locking depression on the upper face of the refill cartridge and thus refill cartridge is locked into the receiving socket.

Because the first part of the lever mechanism is pushed for example with a spring against the end face of the refill cartridge, then when locking system is released, the first part pushes refill cartridge at least partially out of the receiving socket.

The third part of the lever mechanism locks lever mechanism into the holding position (i.e. to the locked position of the refill cartridge).

The lever mechanism of the locking system is locked by the third part of the lever mechanism into the holding position with help of the electromagnetic latch, which in its non-activated (unenergized) state is biased into the locking position. This insures that for example during a power failure the refill cartridge remains locked into its receiving socket.

The control means of the locking system are connected to the control system of the automatic growing cabinet—this controls according to the pre-determined program and signals from the sensors an unlocking of the locking system of the refill cartridges.

It obvious that when locking system according to present invention is used in other type of systems (e.g., pools, jacuzzis, aquariums, etc.), the control means of the locking system are connected to the control system of that particular system (i.e. pools, jacuzzis, aquariums, etc.).

Emptying containers are provided with sensors for determining levels of liquids contained in them. This is used to determine whether specific emptying container has enough space to receive a content of the new refill cartridge.

In addition said control means of the locking system may be set to lock refill cartridge after being inserted into the receiving socket for a pre-determined emptying period of refill cartridge, where during that period removing of the refill cartridge from the receiving socket is blocked by the locking system. This ensured that the content of the refill cartridge has completely drained into the emptying container. Also this ensures that any residues of the content at the discharge opening of the refill cartridge have been dried.

Preferably the volume of the emptying container of each refill cartridge corresponds at least to the twofold volume of the content of the corresponding refill cartridge.

The emptying means of the refill cartridge comprises a piercing means of the discharge opening of the cartridge actuatable by the end face of the cartridge.

The emptying means of the refill cartridge comprises a piercing means of the discharge opening of the cartridge actuatable by the end face of the cartridge, where said piercing means comprises a activation part of the piercing means drivable by the end face of the cartridge, where said activation part rotates piercing means around rotation axis crosswise to the insertion direction of the cartridge, where on the other side of the axis said piercing means comprises piercing tip, which in the situation when refill cartridge is pressed completely into the receiving socket, is pressed into the discharge opening of the cartridge.

Optionally the activation of the emptying means can be implemented by a electro-magnetic actuator, which is activated when the refill cartridge is locked into the receiving socket.

The cross-section of the refill cartridge crosswise to the insertion direction corresponds to the shape of the insertion opening of the receiving socket.

This is necessary to ensure that into each receiving socket could be inserted only refill cartridge with specific shape, as refill cartridges with different shape have different contents. Thus is avoided replenishing emptying container with wrong content.

BRIEF DESCRIPTION OF DRAWINGS

The present invention is now described in greater detail with references to the accompanying drawings, in which:

FIG. 2 represents front view, FIGS. 3 and 4 represent corresponding side views and in FIGS. 5 and 6 for better overview the lever mechanism is represented in two different three-dimensional views;

FIG. 8 represents front view, FIG. 9 represents front view and FIG. 10 represents an axonometric view;

BEST MODE FOR CARRYING OUT THE INVENTION

Figure 1:
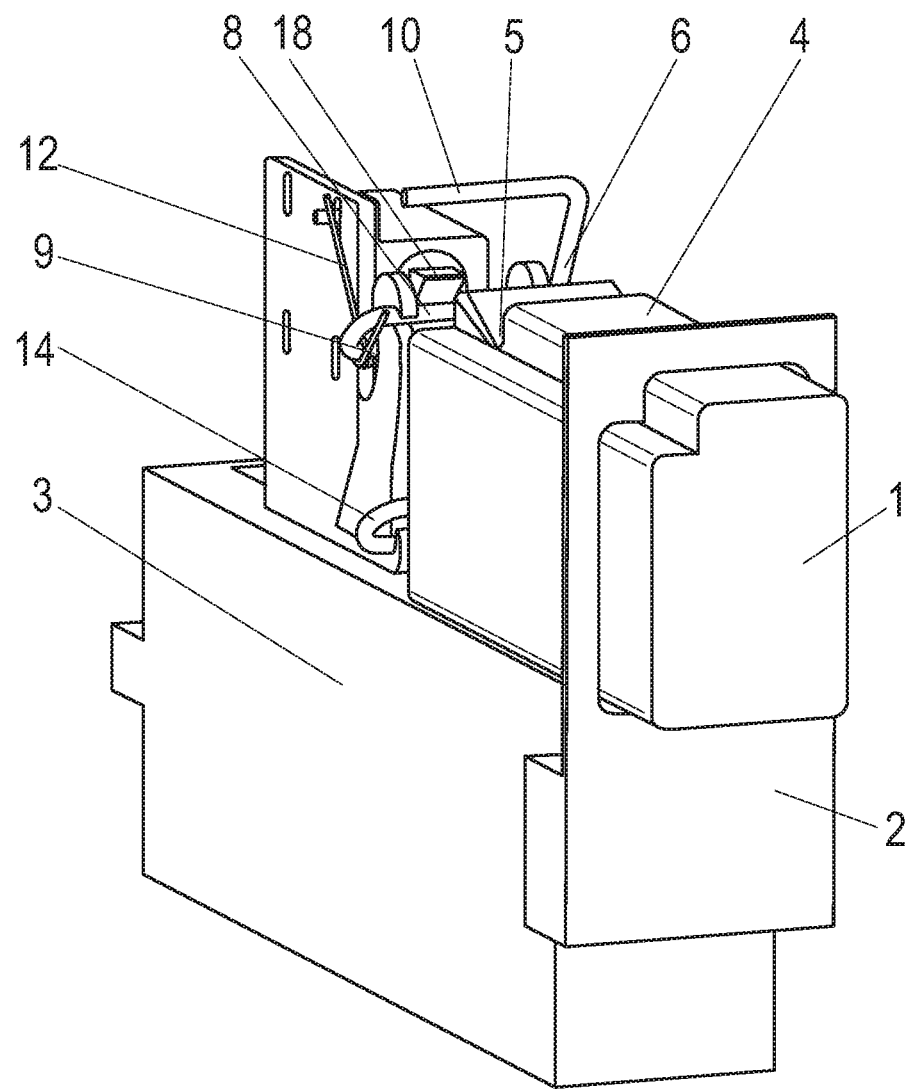
FIG. 1 represents an axonometric view of the refill cartridge being inserted into the receiving socket, when refill cartridge has not been yet locked.
Figure 2:
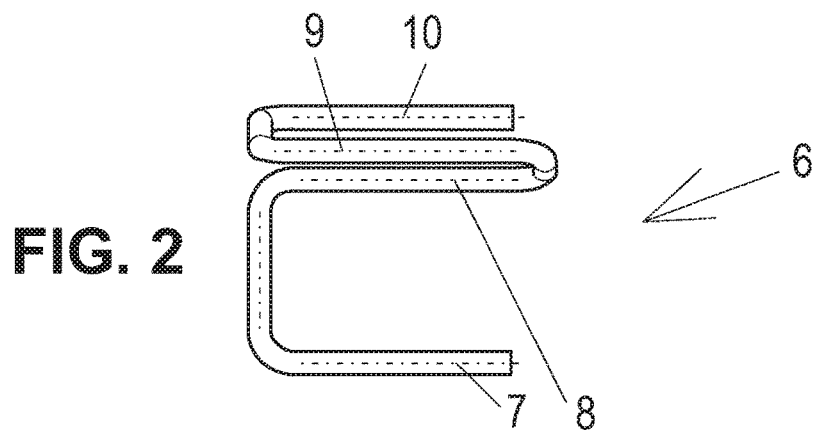
FIGS. 2 to 6 represent in different views a lever mechanism of the locking system, where
Figures 3, 4:
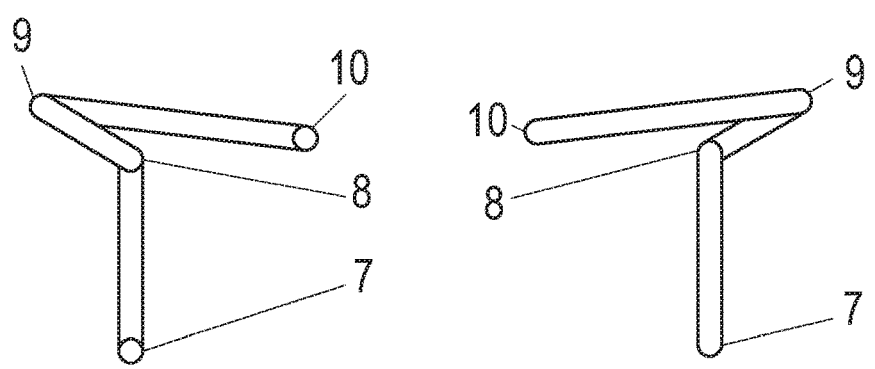
Figures 5, 6:
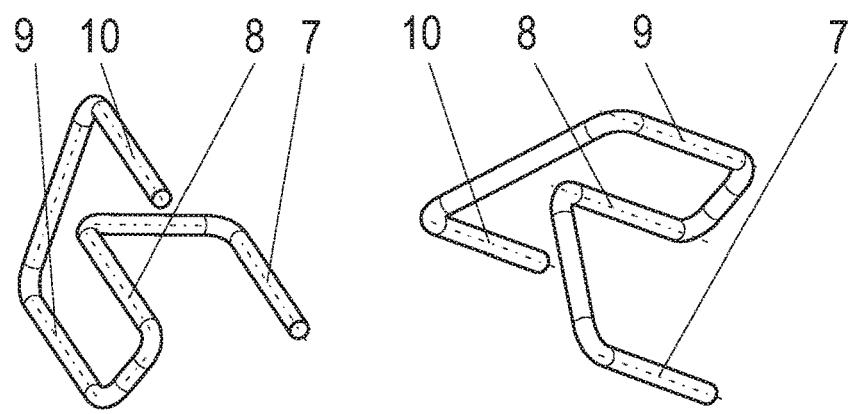
Figure 7:
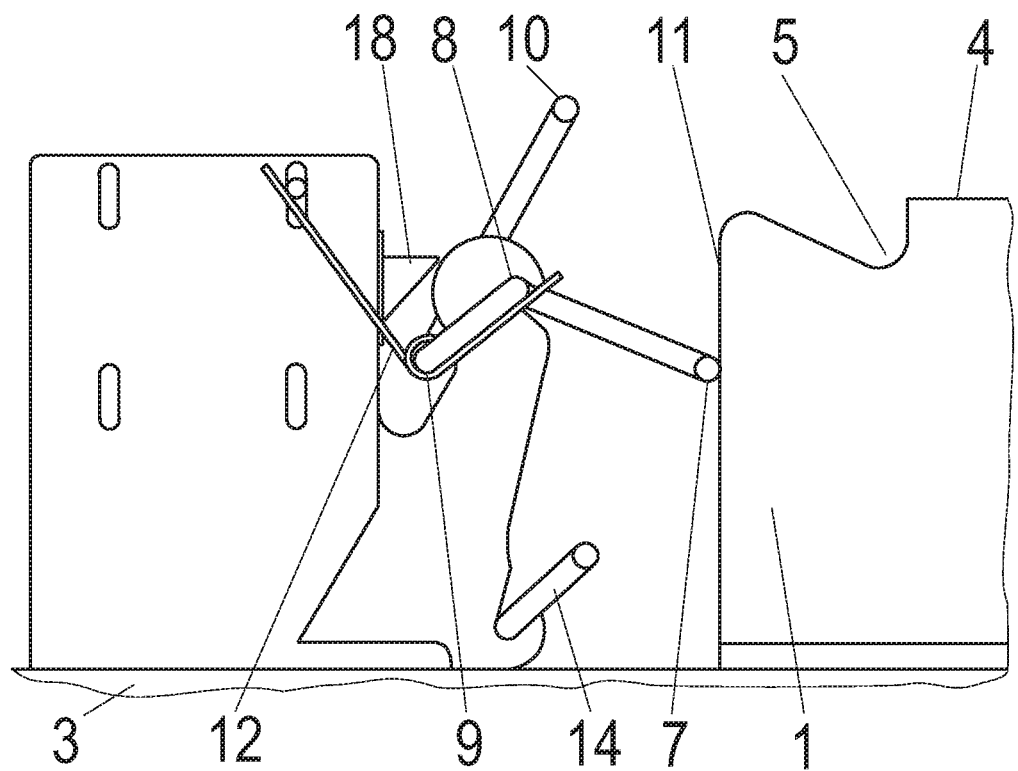
FIG. 7 represents enlarged detailed side view of the refill cartridge pushed into the receiving socket, when the end face of the refill cartridge is just become into contact with the first part of the lever mechanism.
Figure 8:
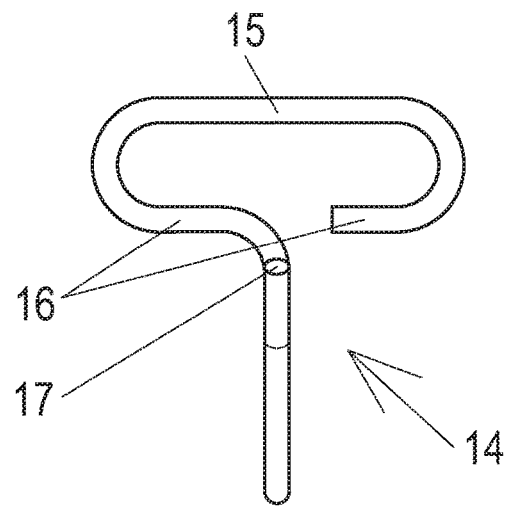
FIGS. 8 to 10 represent in different views a piercing means of the discharge opening, where
Figure 9:
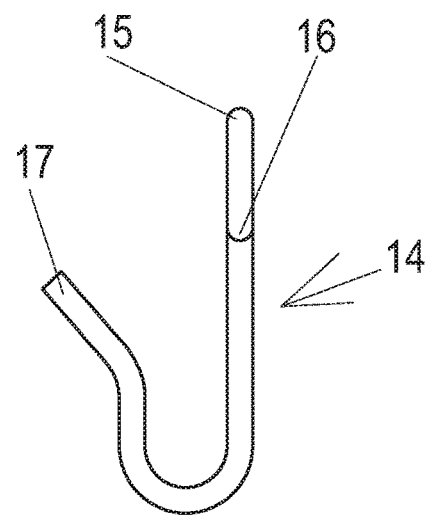
Figure 10:
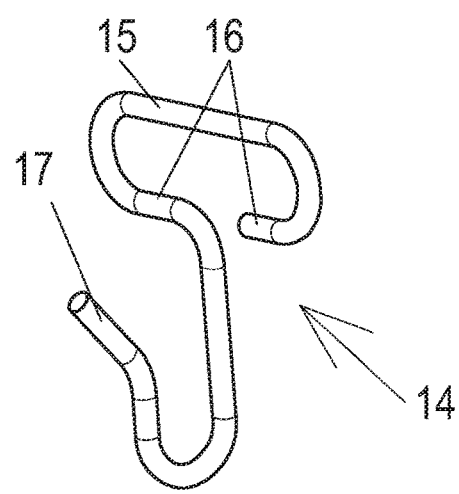
Figure 11:
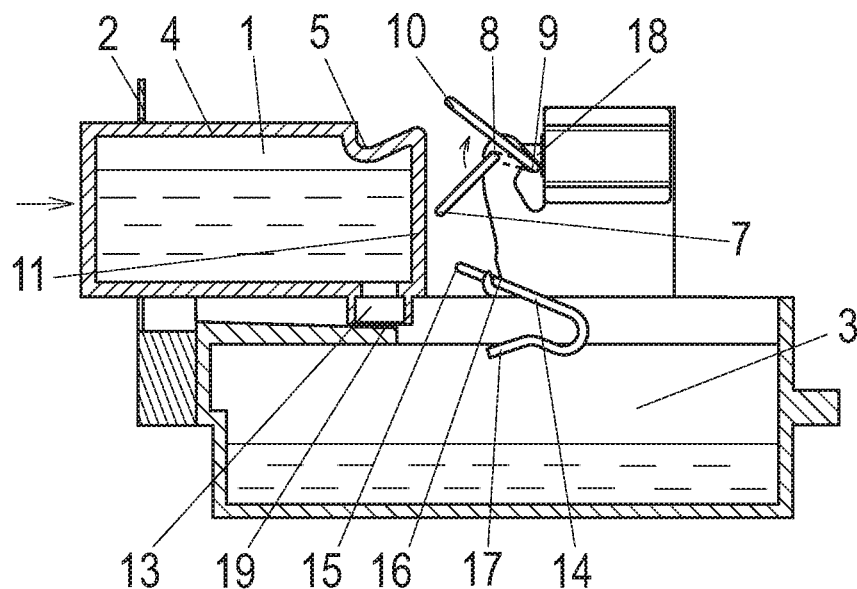
FIGS. 11 to 13 represent in longitudinal sections of refill cartridge inserted into the receiving socket in three different positions, where in FIG. 11 the refill cartridge is just inserted into the receiving socket and it does not touch the lever mechanism of the locking system, where in FIG. 12 the end face of the refill cartridge is already pushed against the first part of the lever mechanism and the lever mechanism has started to rotate around its second part, and in FIG. 13 the refill cartridge is pushed all the way into the receiving socket and it has been locked into place with the fourth part of the lever mechanism and electromagnetic latch.
Figure 12:
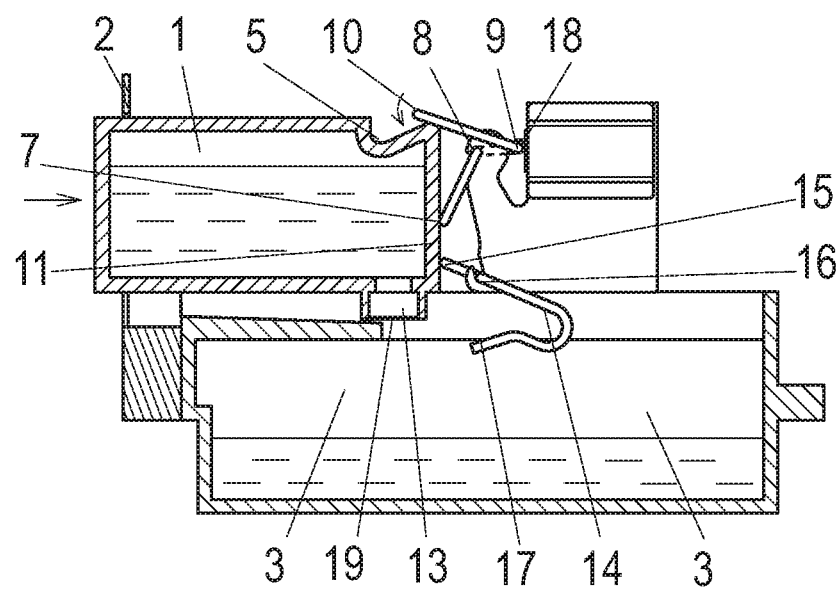

The attached drawings represent only one possible embodiment out of many other possible embodiments of the locking and emptying system of a refill cartridges. In the attached drawings are depicted only one refill cartridge 1 in the receiving socket 2 and on the emptying container 3. Understandably the actual device may comprise side by side multiple refill cartridges each in its corresponding receiving socket. Also for the clarity of the drawings sensors, limit switches, wiring and other details which are not essential for understanding present invention are omitted from the drawings.

On the upper face 4 of the refill cartridge 1 is a locking depression 5, at the side of the end of the cartridge to be inserted into the receiving socket 2. This depression is intended to engage with corresponding part 10 of the lever mechanism 6 of the locking system, see FIGS. 1 and 11 to 17.

The lever mechanism 6 comprises 4 mutually rigidly connected parts 7, 8, 9 and having mutually parallel longitudinal axes, see FIGS. 2 to 6. In the embodiment depicted on drawings said lever mechanism is made from bent bar.

As can be seen from FIGS. 7, 11, 12, 14 and 15, when refill cartridge 1 is inserted into the receiving socket 2, the end face 11 of the refill cartridge 1 is pushed against the first part 7 of the lever mechanism 6, as a result the lever mechanism 6 is rotated around its second part 8. Because parts 7, 8, 9 and 10 of the lever mechanism 6 are mutually rigidly connected, third part 9 and fourth part 10 of the lever mechanism 6 are also rotated around the second part 8. Lever mechanism 6 is biased by spring 12 to rotate around second part 8 in order to push its first part 7 against the end face 11 of the refill cartridge 1.

When the refill cartridge 1 is inserted, the activation part 15 of the piercing means 14 of the discharge opening 13 is also pushed against the end face 11, where said activation part 15 rotates piercing means 14 around rotation axis 16, where said axis 16 is crosswise to the insertion direction of the refill cartridge 1 and where at the other side of the rotation axis piercing means 14 comprises a piercing tip 17, where said piercing tip 17 is pushed into the discharge opening 13 of the refill cartridge 1, when refill cartridge 1 is pushed all the way into the receiving socket 2. Specially from the FIG. 13 can bee seen, that in the locked position of the refill cartridge 1 the piercing tip 17 has pierced membrane 19 closing the discharge opening 13 of the refill cartridge 1.

In this position the lever mechanism 6 of the locking system is locked by its third part 9 with the help of the electromagnetic latch 18 into the holding position, i.e. locking position of the refill cartridge 1.

The piercing tip 17 of the piercing means 14 moves into the discharge opening 13 of the refill cartridge 1 from below through groove at the top of the emptying container 2.

Figure 13:
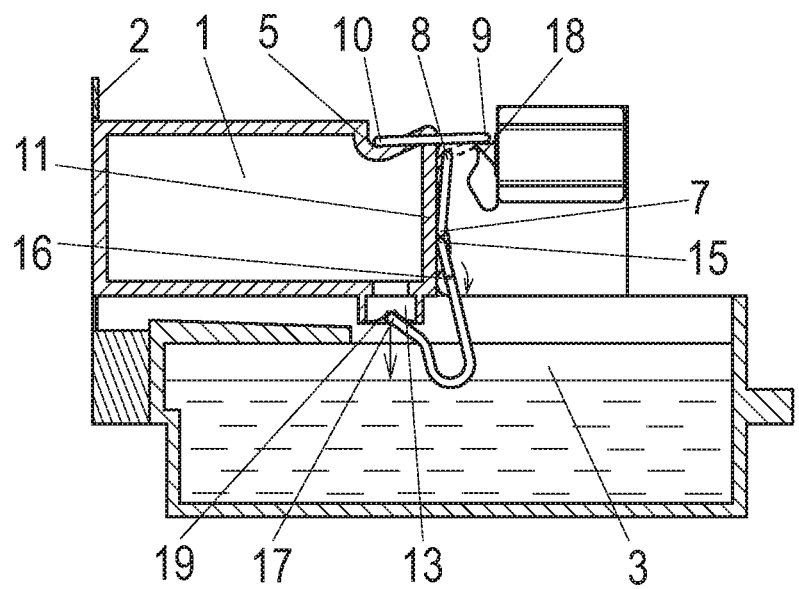
Figure 14:
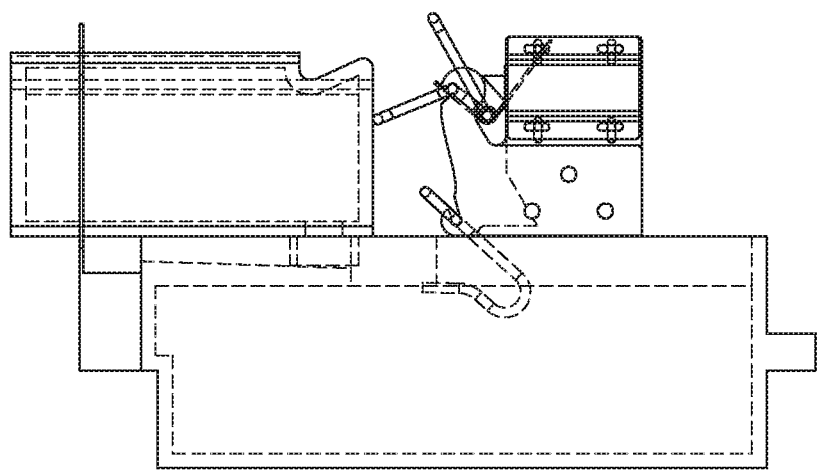
FIGS. 14 and 15 represent corresponding side views of the refill cartridge corresponding to the position in FIG. 7.
Figure 15:
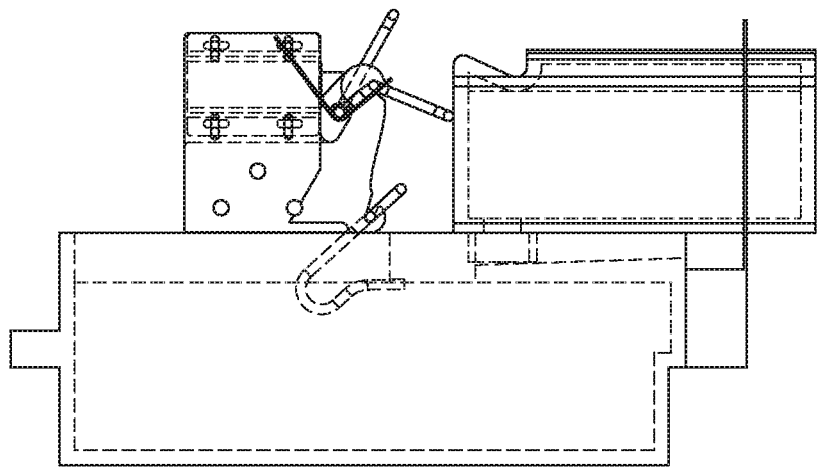
Figure 16:
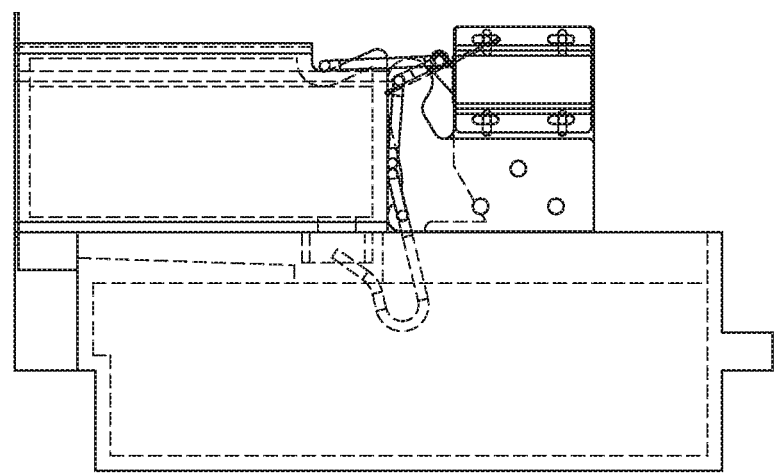
FIGS. 16 and 17 represent corresponding side views of the refill cartridge corresponding to the position in FIG. 13.
Figure 17:
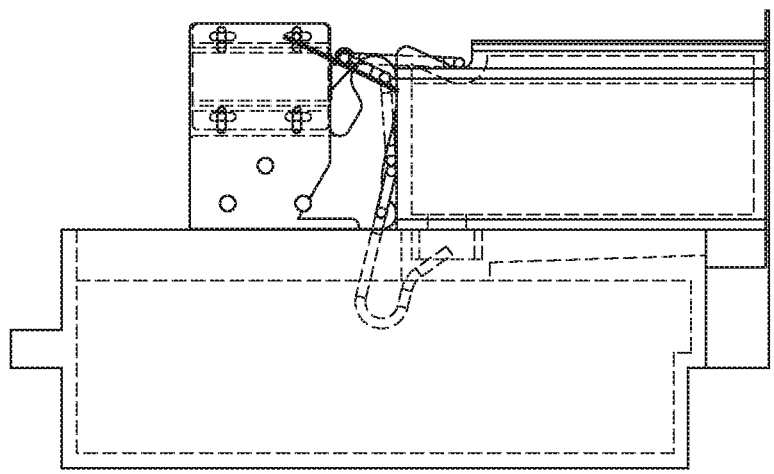

As can be seen from FIGS. 13, 16 and 17, the refill cartridge 1 can not be removed from the receiving socket 2 until third part 9 of the lever mechanism 6 is locket by electromagnetic latch 18. The forth part 11 of the lever mechanism 6 engages locking depression 5 on the upper face 4 of the refill cartridge 1.

Because in the normal state of the electromagnetic latch 18 is biased into the locking position, i.e., when no current runs through it (i.e. its not activated), said latch is in the locking position, its ensured that refill cartridge can be removed from the receiving socket 2 only when activation signal (current) is led from the control means of the locking system into the electromagnetic latch 18, as a result latch releases third part 9 of the lever mechanism 6 and then lever mechanism 6 can rotate due the force of the spring 12 such that lever mechanism is pushed by its first part 7 against the and face 11 of the refill cartridge 1, as a result refill the other end of the cartridge 1 is pushed out of the receiving socket 2 and then refill cartridge can be removed by the user.

Control means of the locking system are connected or integrated with the control electronics of the automatic growing cabinet.

Each emptying container 3 is provided with a sensor (not shown) to determine the level of its content. This information is necessary, because preferably empty refill cartridge 1 is released from the receiving socket 2 only then, when the level of the liquid in the receiving container 3 is dropped in an amount, which enables by the receiving container to receive the full content of the next full refill cartridge 1.

For an additional safety measure the control means of the locking system are set to lock the refill cartridge after insertion into the receiving socket for the minimal emptying period of the refill cartridge, where during that period the removal of the refill cartridge is blocked by the locking system. This is necessary to ensure, that all the content of the refill cartridge has emptied into the emptying container and possible residues (drops) of the content at the discharge opening of the refill cartridge have been dried.

LIST OF REFERENCE NUMBERS

1—refill cartridge
2—receiving socket
3—emptying container
4—upper face of the refill cartridge
5—locking depression
6—lever mechanism
7—first part of the lever mechanism
8—second part of the lever mechanism
9—third part of the lever mechanism
10—fourth part of the lever mechanism
11—end face of the refill cartridge
12—spring—vedru
13—discharge opening of the refill cartridge
14—piercing means of the discharge opening
15—activation part
16—rotation axis (pivot)
17—piercing tip
18—electromagnetic latch
19—membrane

The invention claimed is:

1. A locking and emptying system of a refill cartridge (1) containing nutrients or chemicals, said locking and emptying system comprising at least one receiving socket (2) for locking and emptying the refill cartridge (1), in every said receiving socket (2) a locking mechanism of the refill cartridge (1), discharge means of the refill cartridge (1) and control means of the locking and empting system and for the refill cartridge (1) a emptying container (3), characterized in that in the vicinity of the insertion end of the refill cartridge (1) to be inserted into the receiving socket of an upper face (4) of the refill cartridge (1) comprises a locking depression (5);

the locking mechanism in the receiving socket (2) comprises a lever mechanism (6) operable by an end face (11) of the refill cartridge (1), said lever mechanism (6) comprising four mutually rigidly connected parts (7, 8, 9, 10) having mainly parallel longitudinal axes, said longitudinal axes are crosswise to the insertion direction of the refill cartridge (1);

where in the receiving socket (2) first part (7) of the lever mechanism (6) is placed rotatably around the longitudinal axis of second part (8) together with third part (9) and fourth part (10) and where said first part (7), third part (9) and fourth part (10) are biased to rotate around the longitudinal axis of said second part (8) so that said first part (7) is pressed against end face (11) of the refill cartridge (1);

where in the position where said refill cartridge (1) is inserted into the receiving socket (2) with its end thee (11), said end face (11) is pressed against the first part (7) of the lever mechanism (6), as a result said first part (7) is rotatable around the second part (8) of the lever mechanism (6) together with said third (9) and fourth part (10) of the lever mechanism (6); and where in the position where said refill cartridge (1) is pressed completely into the receiving socket (2), said first part (7) pressed against the end face (11) of the refill cartridge (1) is rotated around the second part (8) of the lever mechanism (6) together with third part (9) and fourth part (10) of the lever mechanism (6) so that said fourth part (10) is engaged with the locking depression (5) on the upper face (4) of the refill cartridge (1) to the locked position of the refill cartridge (1) in the receiving socket (2), where said lever mechanism (6) is locked into a holding position by the third part (9).

2. The locking and emptying system according to claim 1, characterized in that a discharge means of the refill cartridge (1) comprises a piercing means (14) of a discharge opening (13) of the refill cartridge (1) operable by the end face (11) of the refill cartridge (1).

3. The locking and emptying system according to claim 1, characterized in that a discharge means of the refill cartridge (1) comprises a piercing means (14) of a discharge opening (13) of the refill cartridge (1) operable by the end face (11) of the refill cartridge (1), said piercing means (14) comprising an activation part (15), a piercing tip (17) and between them a rotation axis (16) crosswise to the insertion direction of the refill cartridge (1), where in the position where said refill cartridge (1) is pressed completely into the receiving socket (2) said piercing tip (17) is in the position rotated around the rotation axis (16) by the end face (11) of the refill cartridge (1) pressed against the said activation part (15), where said piercing tip (17) is pressed into the discharge opening (13) of the refill cartridge (1).

4. The locking and emptying system according to claim 1, characterized in that the lever mechanism (6) of the locking system is locked by the third part (9) of the lever mechanism (6) into the holding position with help of the electromagnetic latch (18), which in its non-activated state is biased towards le locking position.

5. The locking and emptying system according to claim 1, characterized in that the cross section of the refill cartridge (1) crosswise to the insertion direction of the refill cartridge (1) corresponds to the shape of an inlet opening of the receiving socket (2) of the refill cartridge (1).

* * * * *